United States Patent [19]
Takahashi et al.

[11] 3,783,315
[45] Jan. 1, 1974

[54] FLYWHEEL MAGNETO HAVING TRIGGER GENERATOR FOR IGNITING ENGINE

[75] Inventors: Osamu Takahashi, Hitachi; Nobuhico Ogasawala, Mito, both of Japan

[73] Assignee: Hitachi, Ltd., Tokyo, Japan

[22] Filed: Nov. 18, 1971

[21] Appl. No.: 199,981

[30] Foreign Application Priority Data
Nov. 25, 1970  Japan.............................. 45/104277

[52] U.S. Cl...................... 310/74, 322/49, 310/153
[51] Int. Cl. .............................................. H02k 7/02
[58] Field of Search...................... 310/74, 153, 168, 310/169, 170, 67; 123/149 D, 148 E; 322/4, 50, 49, 51

[56] References Cited
UNITED STATES PATENTS

| | | | |
|---|---|---|---|
| 3,140,413 | 7/1964 | Terry | 310/74 |
| 3,566,851 | 3/1971 | Pfrommer | 310/74 |
| 3,619,679 | 11/1971 | Carmichael | 310/74 |
| 2,812,458 | 11/1957 | Mennesson | 310/153 |
| 2,945,138 | 7/1960 | Strang | 310/153 |
| 3,193,713 | 7/1965 | Larson | 310/74 |

*Primary Examiner*—R. Skudy
*Attorney*—Craig, Antonelli & Hill

[57] ABSTRACT

A trigger generator is incorporated in a flywheel magneto which is directly coupled to the crankshaft of an engine to be driven thereby. A plurality of rotary magnetic poles are mounted on the body portion of the flywheel to constitute a rotor, and the iron core of the trigger generator is disposed in the space defined between the magnetic poles and the hub portion of the flywheel so as to establish a magnetic path which passes through the iron core and the hub and body portions of the flywheel. The trigger generator generates an output in response to the rotation of the engine without producing any noise voltage. Ignition can be reliably attained during each rotation and a high output can be obtained even when the engine is rotating at a low speed.

7 Claims, 8 Drawing Figures

PATENTED JAN 1 1974

INVENTORS
OSAMU TAKAHASHI, NOBUHICO OGASAWALA
BY
Craig, Antonelli & Hill
ATTORNEY

FLYWHEEL MAGNETO HAVING TRIGGER GENERATOR FOR IGNITING ENGINE

BACKGROUND OF THE INVENTION

1. Field of the Invention

This invention relates to a flywheel magneto which is directly connected to the crankshaft of an engine and incorporates therein a trigger generator for igniting the engine.

2. Description of the Prior Art

U.S. Pat. No. 3,490,426 discloses a contactless engine ignition system in which a permanent magnet is mounted on the flywheel of a flywheel magneto and a trigger coil is secured within the flywheel. An a.c. pulse is produced in the trigger coil during rotation of the magnetic and this trigger pulse is supplied to an engine ignition circuit including a Zener diode, a silicon controlled rectifier, a capacitor and a transformer for igniting the engine. According to the arrangement proposed by the patent, only one permanent magnet is mounted on the flywheel to serve solely for ignition power supply and this magnet is utilized for energizing the trigger coil for igniting the engine. However, the power produced by this power supply is quite small and other power requirement, for example, lighting cannot be supplied by this power supply. While large power enough to meet the lighting requirement can be obtained by increasing the number of permanent magnets, the desired 1 : 1 relationship between the output of the trigger generator and the rotation of the engine cannot be obtained resulting in the impossibility of ignition of the engine in each rotation. Thus, the proposed flywheel magneto is not substantially practically usable for a multicylinder engine while it can be satisfactorily used for a small-sized, single cylinder engine.

SUMMARY OF THE INVENTION

It is an object of the present invention to provide a flywheel magneto in which a trigger generator of simple construction is rationally incorporated for controlling the gate of a silicon controlled rectifier forming a part of a contactless ignition system for an engine.

Another object of the present invention is to provide a flywheel magneto having a trigger generator which ensures ignition of fuel in one cylinder in each rotation of the engine crankshaft.

A further object of the present invention is to provide a flywheel magneto having a trigger generator which is suitable for use in a multicylinder engine.

According to one feature of the present invention, a plurality of rotary magnetic poles are mounted on the body portion of a flywheel whose hub portion is directly connected to the crankshaft of an engine for rotation, and a trigger generator is disposed in the space defined between the rotary magnetic poles and the hub portion of the flywheel in such a manner that the magnetic flux density is alternately increased and decreased with the rotation of the flywheel. The trigger generator in the flywheel magneto of the present invention ensures ignition of fuel in each rotation of the engine even when the magneto is constructed so as to produce a large igniting power output or a large lighting power output.

DESCRIPTION OF THE PREFERRED EMBODIMENT

Figure 1:
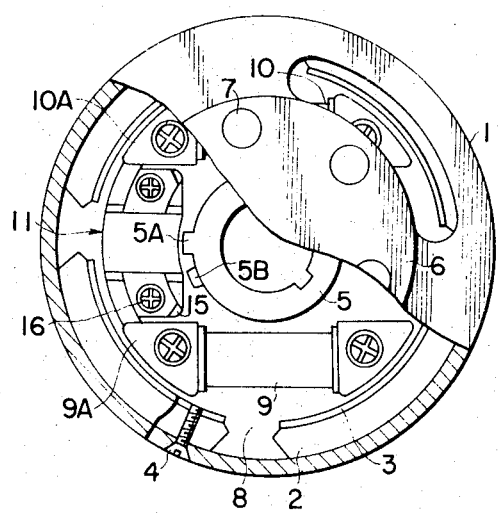
FIG. 1 is a partly cut-away front elevation of a flywheel magneto having a trigger generator embodying the present invention.
Figure 2:
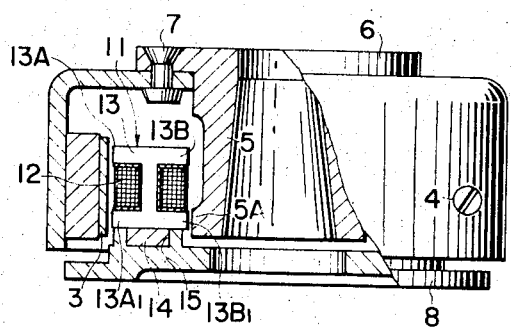
FIG. 2 is a partly sectional side view of the flywheel magneto shown in FIG. 1.

Referring to FIGS. 1 and 2, a plurality of axially magnetized magnets 2 each having a pole piece 3 are secured in equally spaced relation to the inner peripheral surface of a generally cup-shaped body portion of a flywheel 1 of iron by screws 4. A rotary shaft 5 extends through the body portion of the flywheel 1 and is secured at its flanged portion 6 to the body portion of the flywheel 1 by rivets 7 to constitute a rotor. An ignition voltage generating coil 9 is wound around a laminated iron core 9A, while a lighting voltage generating coil 10 is wound around a laminated iron core 10A, and these iron cores 9A and 10A are secured by screws to an armature base 8 of aluminum thereby constituting a stator.

A trigger generator 11 is composed of a generally H-shaped iron core 13, a trigger voltage generating coil 12 wound around the iron core 13, and a base 14 supporting the iron core 13 thereon. The base 14 is received in a guide groove 15 formed on the armature base 8 and is fixed in place by screws 16. The end portions 13A and $13A_1$ of the H-shaped iron core 13 are spaced by a small gap from the pole pieces 3, and the end portions 13B and $13B_1$ of the H-shaped iron core 13 are similarly spaced by a small gap from two projections 5A and 5B which extend from the rotary shaft 5 in such a manner as to define an ignition angle $\phi$ therebetween. The base 14 of the trigger generator 11 is preferably adjustably received in the guide groove 15 so that its position can be freely adjusted for regulating the engine ignition timing.

Figure 3:
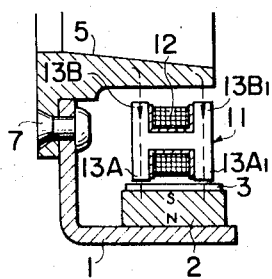
FIGS. 3 to 5 are sectional views of parts of the flywheel magneto to illustrate the operation of the trigger generator.
Figure 4:
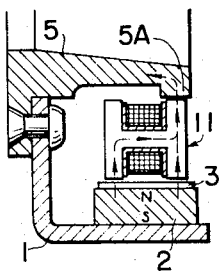
Figure 5:
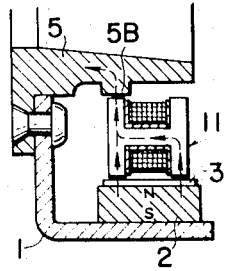

In one phase of the operation as shown in FIG. 3 in which the relative positions of the H-shaped iron core 13, rotary shaft 5 and pole pieces 3 are such that the end portions 13B and $13B_1$ of the H-shaped iron core 13 are not opposed by anyone of the projections 5A and 5B of the rotary shaft 5, the magnetic flux flows through a leakage magnetic path as shown by the broken lines in FIG. 3 and no voltage is induced in the trigger voltage generating coil 12. Then, when the projection 5A of the rotary shaft 5 is opposed by the end portion $13B_1$ of the H-shaped iron core 13 as shown in FIG. 4, the magnetic flux flows through a path which is traced from the magnet 2 — pole piece 3 — end portions 13A of H-shaped iron core 13 — intermediate yoke portion of iron core 13 — end portion $13B_1$ of iron core 13 — projection 5A of rotary shaft 5 to the rotary shaft 5. In FIG. 5, the magnetic flux flows through the intermediate yoke portion of the H-shaped iron core 13 in a direction opposite to that shown in FIG. 4 thereby completing one cycle. Thus, a voltage is induced in the trigger voltage generating coil 12, and this voltage is applied to the ignition circuit to control the gate of a silicon controlled rectifier thereby controlling the ignition circuit.

While the embodiment above described has referred to the case in which the projections 5A and 5B are suitably formed on the rotary shaft 5 for obtaining a sufficient trigger voltage, it is apparent that these projections may be replaced by recesses thereby attaining the substantially same effect.

Figure 6:
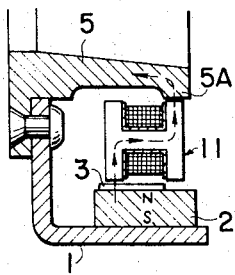
FIGS. 6 and 7 are sectional views of parts of another embodiment of the present invention.
Figure 7:
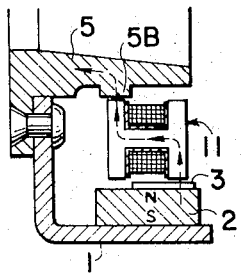
Figure 8:
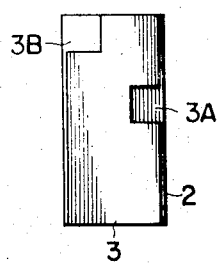
FIG. 8 is a front elevation of a pole piece preferably used in the embodiment shown in FIGS. 6 and 7.

Another embodiment of the present invention has a structure as shown in FIGS. 6 to 8. This embodiment comprises a plurality of pole pieces 3 each having a shape as shown in FIG. 8. Referring to FIG. 8, each pole piece 3 is formed with a pair of cutouts 3A and 3B so that more magnetic flux can pass through the intermediate yoke portion of an H-shaped iron core 13 thereby producing a higher trigger voltage.

When a high trigger voltage is not required during the rotation of the engine at a low speed, anyone of the projections 5A and 5B formed on the rotary shaft 5 may be eliminated. This arrangement provides a low trigger voltage due to the fact that the magnetic flux flows through the intermediate yoke portion of the H-shaped iron core 13 during the half cycle only. All these projections 5A and 5B may be eliminated depending on the conditions of operation.

It will be understood from the above description that the flywheel magneto according to the present invention is featured by the fact that it comprises a trigger generator including an H-shaped iron core disposed fixedly between a plurality of rotary magnetic poles and a rotary shaft, and the rotary shaft and the pole pieces are suitably shaped to cooperate with each other so as to increase and decrease the magnetic flux passing through the intermediate yoke portion of the H-shaped iron core during the operation of the engine thereby deriving an output sufficient to control the load.

The trigger generator is inexpensive due to the fact that it utilizes the magnets of the flywheel magneto for producing the output. Further, by virtue of the H-shape of the iron core of the trigger generator, no magnetic flux flows through the intermediate yoke portion of the iron core when the trigger voltage generating coil is intermediate between the rotating pole pieces and even when it is opposite to anyone of the pole pieces unless the iron core is opposed by the projections on the rotary shaft, thereby completely eliminating the occurrence of undesirable noise voltage.

While only one trigger voltage generating coil is shown in the embodiments above described, a plurality of such coils may be provided when necessary.

We claim:

1. A flywheel magneto comprising a cup-shaped body portion of a flywheel connected via a hub of the flywheel with a crankshaft of an engine, permanent magnets being equally spaced and mounted on the inner peripheral surface of said cup-shaped body portion, armature portion means for generating output signals in accordance with the change of magnetic flux due to the rotation of said cup-shaped body portion, at least one trigger generating means for generating an electrical output signal for controlling a primary current of an ignition coil, said armature portion means including a fixedly mounted base portion and at least first and second iron cores with power coils disposed on said base portion and having said hub arranged intermediate thereof, said trigger generating means including trigger generating armature means positioned on said base portion between said first and second iron cores, and means for changing the strength of magnetic coupling between said trigger generating armature means and said cup-shaped body portion in accordance with the rotation of said cup-shaped body portion for producing the signal output of said trigger generating means.

2. A flywheel magneto as defined in claim 1, wherein said trigger generating armature means includes a generally H-shaped iron core for preventing occurrence of undesirable noise signals, said H-shaped iron core being adjustably positioned on said base portion in a direction of rotation of said flywheel.

3. A flywheel magneto as defined in claim 2, wherein said permanent magnets are provided with pole pieces, and at least one of said hub and pole pieces of said permanent magnets which are arranged for magnetic coupling with said H-shaped iron core being provided with at least one projection.

4. A flywheel magneto as defined in claim 2, wherein said permanent magnets are provided with pole pieces, and at least one of said hub and pole pieces of said permanent magnets which are arranged for magnetic coupling with said H-shaped iron core being provided with at least one recess.

5. A flywheel magneto as defined in claim 3, wherein said pole piece is provided with at least one cutout.

6. A flywheel magneto as defined in claim 4 wherein said pole piece is provided with at least one cutout.

7. A flywheel magneto as defined in claim 1, comprising a plurality of trigger generating means arranged at different angular positions with respect to said hub.

* * * * *